United States Patent
Kalbas et al.

(10) Patent No.: US 6,212,730 B1
(45) Date of Patent: Apr. 10, 2001

(54) WIPER ARM HAVING A CURVED WIPER ARM BODY

(75) Inventors: Hanswerner Kalbas, Vienna (AT); Wolf Dietrich Hoffman, Haldenwang (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 09/288,822

(22) Filed: Apr. 9, 1999

(30) Foreign Application Priority Data

Apr. 9, 1998 (DE) .............................. 198 16 213

(51) Int. Cl.[7] .................. B60S 1/32; B60S 1/34
(52) U.S. Cl. .................... 15/250.351; 15/250.04
(58) Field of Search ........... 15/250.351, 250.352, 15/250.04, 250.201, 250.34, 250.002, 250.003, 250.21, 250.23; 239/284.1, 284.2

(56) References Cited

U.S. PATENT DOCUMENTS

| | | | |
|---|---|---|---|
| 1,695,342 | * | 12/1928 | Oishei . |
| 3,427,675 | * | 2/1969 | Tibbet ........................ 15/250.04 |
| 3,440,679 | * | 4/1969 | Druseihis .................... 15/250.04 |
| 3,670,354 | * | 6/1972 | Weber ......................... 15/250.04 |
| 3,893,204 | | 7/1975 | Kolb ........................... 15/250.32 |
| 3,916,473 | * | 11/1975 | Williams ..................... 15/250.04 |
| 4,133,071 | * | 1/1979 | Jaske .......................... 15/250.351 |
| 4,347,641 | * | 9/1982 | Kohler et al. ................ 15/230.351 |
| 4,553,283 | | 11/1985 | Speth .......................... 15/250.32 |
| 5,203,049 | * | 4/1993 | Nogawa ....................... 15/250.04 |
| 5,724,699 | * | 3/1998 | Bexten ........................ 15/250.351 |
| 5,894,626 | * | 4/1999 | Edele et al. ................. 15/250.04 |

FOREIGN PATENT DOCUMENTS

| | | | |
|---|---|---|---|
| 1087482 | * | 8/1960 | (DE) ........................... 15/250.351 |
| 2319062 | * | 10/1974 | (DE) ........................... 15/250.351 |
| 3142716 | * | 5/1983 | (DE) ........................... 15/250.351 |
| 84 38 105 U | | 4/1986 | (DE) . |
| 35 25 739 | | 1/1987 | (DE) . |
| 31 42 716 | | 8/1991 | (DE) . |
| 42 29 992 A1 | | 3/1993 | (DE) . |
| 208960 | * | 1/1987 | (EP) ............................ 15/250.351 |
| 477803 A2 | | 4/1992 | (EP) . |
| 525850 | * | 2/1993 | (EP) ............................ 15/250.351 |
| 855665 | | 5/1940 | (FR) . |
| 1138725 | | 6/1957 | (FR) . |
| 2646801 | | 11/1990 | (FR) . |
| 2 108 828 | | 5/1983 | (GB) . |
| 58-85744 | | 5/1983 | (JP) . |

* cited by examiner

*Primary Examiner*—Gary K. Graham
(74) *Attorney, Agent, or Firm*—Barnes & Thornburg

(57) ABSTRACT

A wiper arm for wiping vehicle's windows and having an essentially oblong wiper arm body. The wiper arm body has essentially, along its whole length, a cross-sectional shape which has a first curvature facing the window and a second curvature facing away from the window. The second curvature being smaller than the first curvature.

8 Claims, 1 Drawing Sheet

WIPER ARM HAVING A CURVED WIPER ARM BODY

BACKGROUND AND SUMMARY OF THE INVENTION

The invention relates to a wiper arm for a system for wiping windows, and more particularly for high-speed rail vehicles.

Numerous wiping arrangements have become known, particularly for motor vehicles. For example, European Patent Document EP-A-92201935.1 shows a wiping arrangement which comprises a wiper arm made of a composite material.

Nowadays, large-surface windshields are used not only in the automobile industry but also in rail vehicles, particularly in the high-speed operation, as, for example, in the case of the ICE (Intercity Railroad) of the Deutsche Bahn AG (German Railroad Corporation). Such windshields provide the required large and good field of vision for the driver of the traction vehicle.

Because of the high traveling speed, special problems occur in the operation with respect to wiping arrangements for wiping the front and rear windows of high-speed rail vehicles. Thus, the aerodynamic lift-off forces of conventional wiper arm bodies, for example, of the wiper arrangement according to European Patent Document EP-A-92201935.1, rise considerably at high traveling speeds, particularly above 120 km/h, so that the wiper blades of the wiper blade arrangement lift off the windshield during the ride.

In order to ensure a sufficient press-on force of the wiper blade, fastened to the wiper arm body and wiper arm, onto the windshield also at high speeds, wind deflector plates have been arranged on the arms and/or wiping blades of the arrangement known so far. The wind deflector plates counteract the lift-off forces which occur at higher vehicle speeds and reduce the press-on force onto the wiper blade.

However, it was a disadvantage of such deflector plates that they considerably restricted the field of vision of the traction vehicle driver and the effectiveness could not be ensured under all possible approach flow conditions. Furthermore, the solutions were very expensive and required high implementation cost because a large number of component parts had to be assembled to form a wiper arm arrangement.

It is therefore an object of the invention to provide a wiper arm for a wiper arm arrangement for wiping windows, particularly in the case of high-speed rail vehicles, to overcome the above-described problems of the state of the art.

In particular, a wiper arm is to be provided wherein the lift-off forces can be kept low also at high traveling speeds and simultaneously a field of vision for the traction vehicle driver is not reduced under unfavorable weather conditions. In addition, a solution is endeavored at reasonable cost.

According to the invention, these objects are achieved in that the wiper arm body of the wiper arm, over its whole length, has essentially a cross-sectional shape with a first curvature facing the windshield and a second curvature facing away from the windshield. The second curvature is smaller than the first curvature.

In such an embodiment of the wiper arm body, the overspeeds and therefore the vacuums occurring on the side of the wiper arm body facing the windshield cause a press-on force which increases with the traveling speed and which counteracts the aerodynamic negative lift forces. As generally in aerodynamics, a curvature in the present patent application is the characteristic of a cross-section which is the result of a curving, thus, of the deviation from a straight line from the nose to the end edge which represents the connection of the center points of circles placed in this cross-section and touching its outer contour.

In an advantageous embodiment of the invention, the curvatures are constructed such that the press on force, on the wiper blade fastened to the wiper arm body, in the whole traveling speed range of the high-speed vehicle up to speeds of 400 km/h, exceeds the aerodynamic lift-off forces of the wiper arm from the windshield. At both ends of a motor car or of a railway engine, the effectiveness of the present invention is independent of the alignment with respect to the traveling direction.

It is particularly advantageous for the curvatures to be selected such that the press-on force, on the wiper blades arranged on the wiper arm which occurs at different traveling speeds, assumes an essentially constant value.

In a first embodiment of the invention, the wiper arm body is a solid body.

As an alternative, the wiper arm body may also be designed as a hollow body. This advantageously permits the arrangement of lines inside the hollow body. An example are the supply lines for the spraying water supply.

The wiper arm body according to the invention expediently consists of a fiber composite, which permits the saving of a considerable amount of weight.

In order to ensure a sufficient flexural strength and resistance to bending in the case of wiper arm bodies made of such fiber composites, it is advantageous for the wiper arm body to have fibers which extend in the longitudinal direction as well as diagonally oriented fibers which provide a sufficient shearing strength and resistance to shearing.

Carbon fiber composites are used as particularly advantageous composites for the wiper arm body according to the invention.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
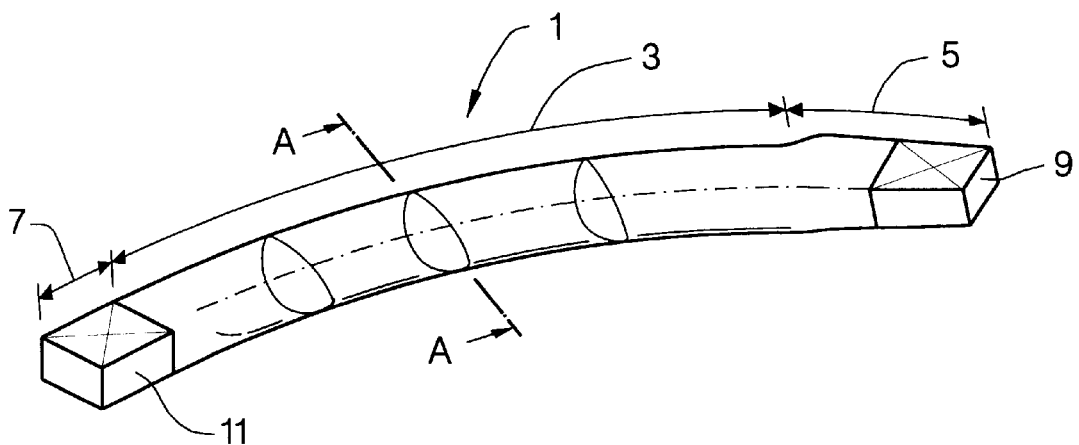
FIG. 1 is a three-dimensional representation of a wiper arm according to the invention with a connection piece for the drive and a connection piece for the wiper arm.

FIG. 1 illustrates an essentially oblong wiper arm body 1 of a wiper arm according to the invention. The wiper arm body 1 has a central area 3, which extends essentially along the whole length, as well as end areas 5, 7. The end area 5 is used as a connection piece 9 for the wiper blade system which is not shown in FIG. 1 and which carries one or several wiper blades which rests against the windshield. The end piece 7 is constructed as a connection piece 11 for the drive of the wiper arm. In the illustrated embodiment, the two end pieces 5, 7 are constructed as square connection pieces.

Figure 2A:
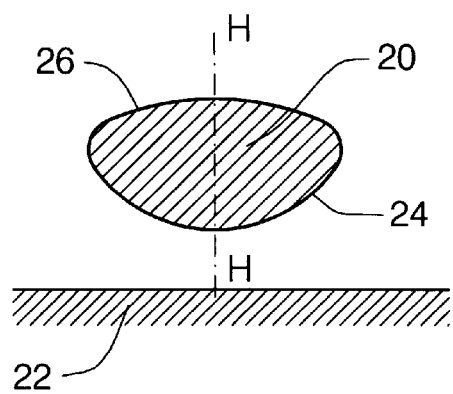
FIG. 2A is a sectional view along Line 2A—2A in FIG. 1 representing the cross-sectional surface of the wiper arm according to the invention, the wiper arm body being constructed as a solid body.

Furthermore, FIG. 1 shows the cross-sectional surfaces in the respective areas, that is, in the end areas as well as in the central area 3. The cross-sectional surface along Line 2A—2A in FIG. 2A is for a wiper arm body which is constructed as a solid body. The cross-sectional surface 20 has a lower first curvature 24 facing the windshield surface 22. According to the invention, the first curvature 24 is constructed such that the overspeeds and therefore vacuums occurring on the side of the wiper arm body facing the windshield have the effect that a press-on force is built up which increases with the traveling speed and counteracts the aerodynamic lift-off forces. This ensures that, also at very high speeds of above 120 km/h, particularly in the high-speed range of above 300 km/h, the press-on force of the wiper blades, which are not shown, is sufficiently high. It is particularly preferable for the curvature to be selected precisely such that the press-on force of the wiper blade remains essentially constant over the whole speed range and changes only within very narrow limits. The press-on force of the wiper blade is essentially applied by springs which are not shown.

In the application, as generally in the field of aerodynamics, a curvature is a characteristic of the cross-section which is the result of the curving (that is, the deviation from a straight line) of a line from the nose to the end edge, which represents the connection of the center points of circles placed in the cross-section and touching its outer contour.

In order to ensure the operability of the wiper arm body according to the invention, it is advantageously provided in the illustrated embodiment that the profile be constructed symmetrically with respect to a center line H-H situated perpendicularly on the windshield.

In addition to the first curvature 24 facing the windshield, the cross-sectional surface may have another second curvature 26 which is directed away from the windshield, the second curvature 26 always having a smaller or weaker construction than the first curvature 24. This results in a negative lift on the wiper arm body when air flows around the wiper arm body, and therefore in a pressing-on of the wiper arm body which is fastened to the connection piece 9 and is not shown.

Figure 2B:
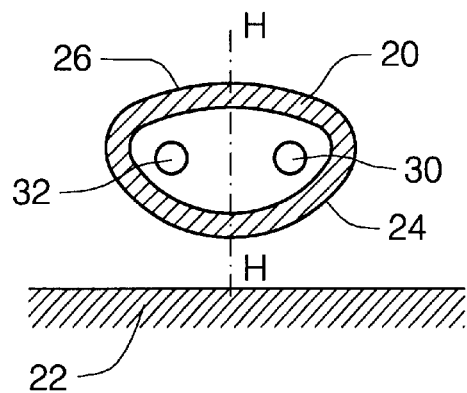
FIG. 2B is a view of a wiper arm body according to the invention which is constructed as a hollow body.

FIG. 2B shows another variant of the wiper arm body according to the invention.

Components identical to those of the wiper arm body according to FIG. 2A have the same reference numbers in FIG. 2B.

The second wiper arm also has a first curvature 24 as well as a second curvature 26. The second curvature 26 always has a smaller and weaker construction than the first curvature 24. In contrast to the embodiment according to FIG. 2A, the embodiment of the invention according to FIG. 2B involves a hollow body, in whose interior lines, particularly supply lines 30, 32, can be arranged. The supply lines may, for example, be the spraying water supply of the corresponding windshield wiper arm.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A wiper arm for supporting a wiper blade for wiping a vehicle window comprising an essentially oblong wiper arm body having, essentially along its whole length between a connecting point for a drive and a connecting point for the wiper blade, a cross-sectional shape which has a first convex curvature facing the window and a second convex curvature facing away from the window, the second curvature being less convex than the first curvature, wherein the first and second curvatures share common endpoints.

2. A wiper arm according to claim 1, wherein the curvatures are constructed such that the wiper arm experiences a press-on force which counteracts a lift-off force acting on the wiper arm, to prevent separation of the wiper blade from the window the press-on force and the lift-off force resulting from air currents induced when the vehicle is moving.

3. A wiper arm according to claim 2, wherein the first and second curvatures are constructed such that the press-on force of the wiper arm is essentially constant when the vehicle is moving.

4. A wiper arm according to one of claim 1 wherein the wiper arm body is a hollow body.

5. A wiper arm according to claim 4, including lines of a window washing system in the hollow body.

6. A wiper arm according to claim 1 wherein the wiper arm body is made at least partly of fiber composite.

7. A wiper arm according to claim 6, wherein the wiper arm body is of fiber composite including fibers extending in a longitudinal direction as well as fibers oriented diagonally with respect to the longitudinal direction.

8. A Wiper arm according to claim 6, wherein the fiber composite is a carbon fiber composite.

* * * * *